(12) United States Patent
Stephan

(10) Patent No.: US 8,011,868 B2
(45) Date of Patent: Sep. 6, 2011

(54) SELF-SEALING FASTENING ASSEMBLY

(75) Inventor: Greg Stephan, Westlake Village, CA (US)

(73) Assignee: Fasten Seal Products, LLC, Westlake Village, CA (US)

( * ) Notice: Subject to any disclaimer, the term of this patent is extended or adjusted under 35 U.S.C. 154(b) by 385 days.

(21) Appl. No.: 12/175,409

(22) Filed: Jul. 17, 2008

(65) Prior Publication Data

US 2010/0014943 A1     Jan. 21, 2010

(51) Int. Cl.
*F16B 43/02* (2006.01)
(52) U.S. Cl. ............................................ 411/542; 52/363
(58) Field of Classification Search .................. 52/347, 52/361–363, 506.06, 741, 4; 411/82, 448, 411/512, 541, 542
See application file for complete search history.

(56) References Cited

U.S. PATENT DOCUMENTS

| | | | | |
|---|---|---|---|---|
| 1,763,264 A * | 6/1930 | Shanks | ............................ | 52/362 |
| 3,073,066 A * | 1/1963 | Edwards et al. | .............. | 52/127.3 |
| 3,216,475 A * | 11/1965 | Jacobsen | ........................ | 411/223 |
| 4,004,626 A * | 1/1977 | Biblin et al. | ................... | 411/277 |
| 4,096,653 A * | 6/1978 | Kaarlela et al. | ................. | 37/457 |
| 4,389,035 A * | 6/1983 | Freeman | ........................ | 248/542 |
| 4,555,206 A * | 11/1985 | Sweeney | .......................... | 411/23 |
| 6,035,595 A | 3/2000 | Anderson | | |
| 2004/0003558 A1* | 1/2004 | Collins et al. | ................ | 52/302.1 |

* cited by examiner

*Primary Examiner* — Robert J Canfield
*Assistant Examiner* — Christine T Cajilig
(74) *Attorney, Agent, or Firm* — Arent Fox LLP

(57) ABSTRACT

A fastening assembly includes a housing, a press, and a sealant material located in a chamber formed between surfaces of the housing and the press. The fastening assembly may be used to install cladding to a structure.

10 Claims, 5 Drawing Sheets

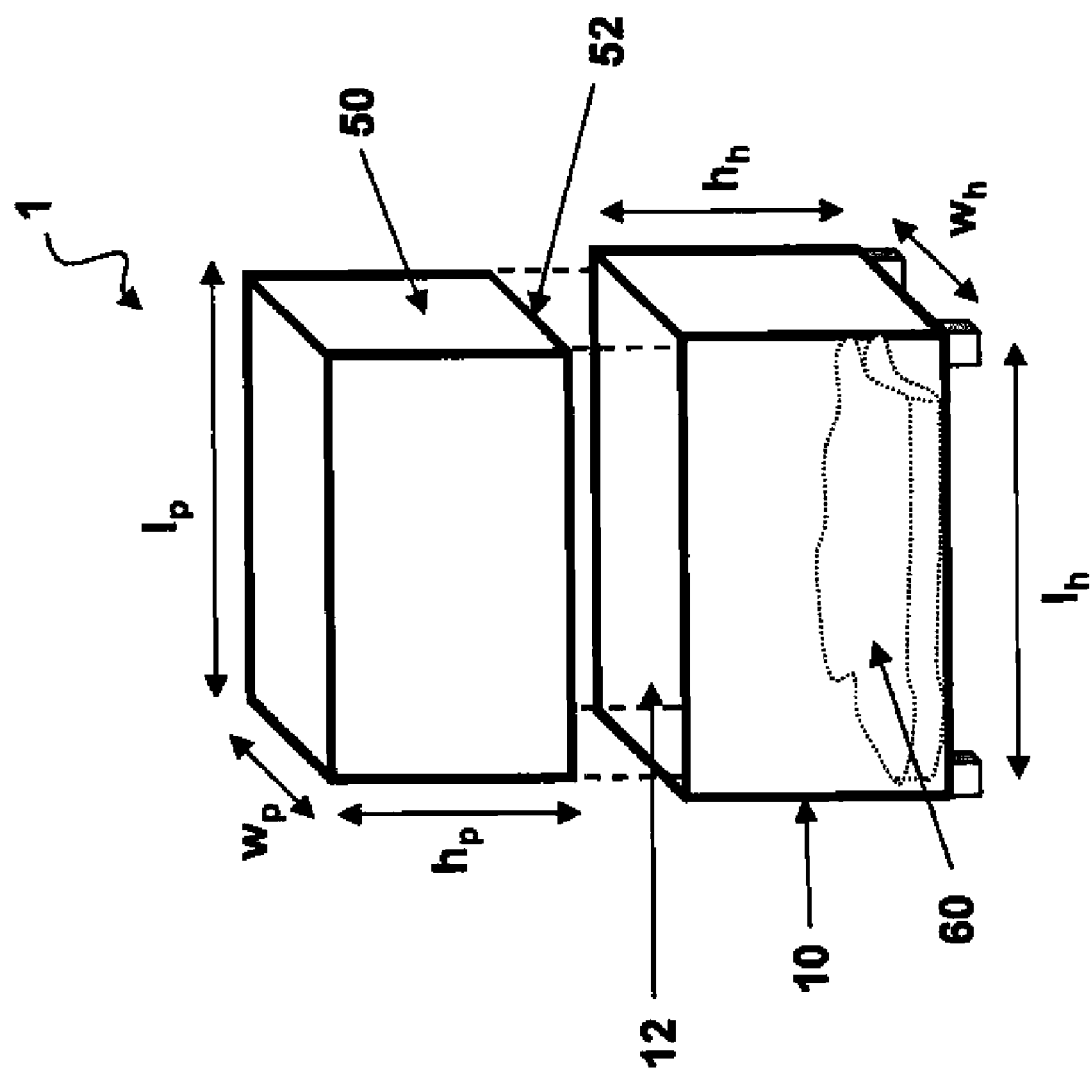

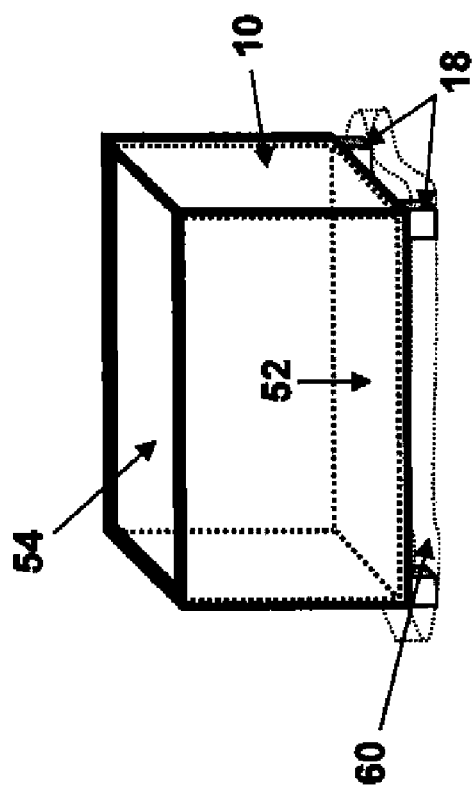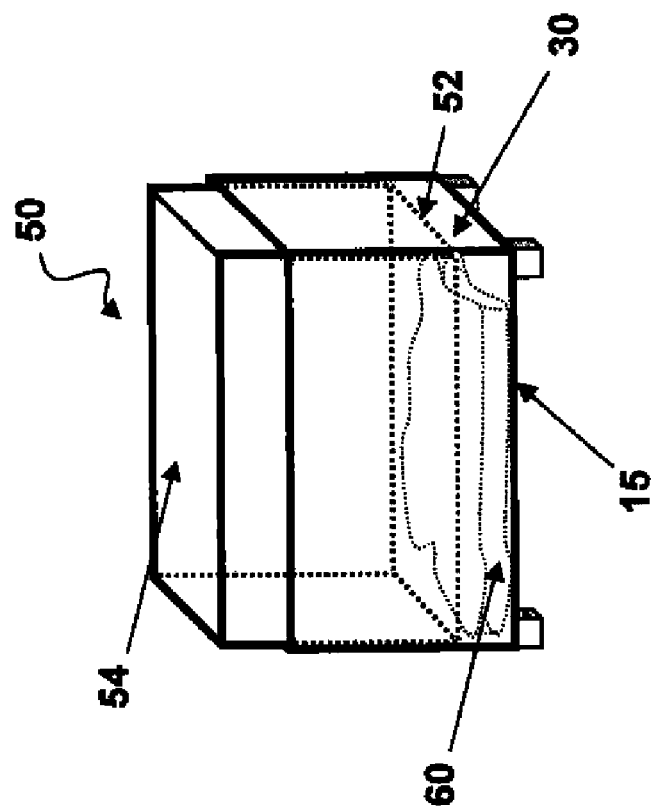

SELF-SEALING FASTENING ASSEMBLY

BACKGROUND

1. Field

The present disclosure relates generally to fastening products, and more particularly, to a self-sealing fastening assembly configured to provide a watertight alternative to components used by the building industry.

2. Background

In the building industry, sealing out water from penetrating to the interior surfaces of a home is always desirable. Making structures watertight against rainwater, irrigation water, and any other moisture is a concern. Creating this seal against the effects of water may be accomplished best by wrapping the exterior surfaces of a home in a building paper and stapling the paper to the framing of a home or other structure. In applications where an exterior surface, such as wood siding or roofing, is subsequently attached, nailing the siding material to the framing requires penetrating the sealing paper. In so doing, the integrity of the building paper may be compromised and moisture may penetrate through the hole and mold, mildew, create freezing and thawing, rot the wood, or cause other problems associated with waterproof exterior systems.

SUMMARY

In one aspect of the disclosure, a fastening assembly includes a housing, a press having a surface that together with the housing forms a chamber, the press being without a fastener inserted therein, and a material in the chamber, wherein the press is movable within the housing to dispense the material from the chamber.

In another aspect of the disclosure, a fastening assembly is configured to be installed between cladding and a structure. The fastening assembly includes a housing, a press having a surface that together with the housing forms a chamber, and a material in the chamber, wherein the press is movable within the housing to dispense the material from the chamber.

In yet another aspect of the disclosure, a fastening assembly includes a housing, a press having a surface that together with the housing forms a chamber, the press being unable to support the shank of a fastener, and a material in the chamber, wherein the press is movable within the housing to dispense the material from the chamber.

In a further aspect of the disclosure, a structure includes cladding, a plurality of fastening assemblies separating the cladding from the structure, each of the fastening assemblies comprising a housing and a press having at least a portion within the housing, a plurality of fasteners, each of the fasteners being driven through the cladding and one of the fastening assemblies into the structure, and a material dispensed from each of the fastening assemblies by the press in the housing when the fastener is driven through said fastening assembly.

In yet a further aspect of the disclosure, a method of installing cladding to a structure using a plurality of fastening assemblies includes placing one of the fastening assemblies against the structure, placing the cladding against a surface of the press, driving a fastener through the cladding and said one of the fastening assemblies into the structure so that the press moves within the housing to dispenses the material from the chamber.

BRIEF DESCRIPTION OF DRAWINGS

Various aspects of the present invention are illustrated by way of example, and not by way of limitation, in the accompanying drawings, wherein:

FIG. 1 is a perspective view illustrating an example of a self-sealing fastening assembly;

FIG. 2A is a perspective view illustrating an example of a self-sealing fastening assembly with the press partially inserted into the housing;

FIG. 2B is a perspective view illustrating an example of a self-sealing fastening assembly with the press completely inserted into the housing;

DETAILED DESCRIPTION

Figure 3:
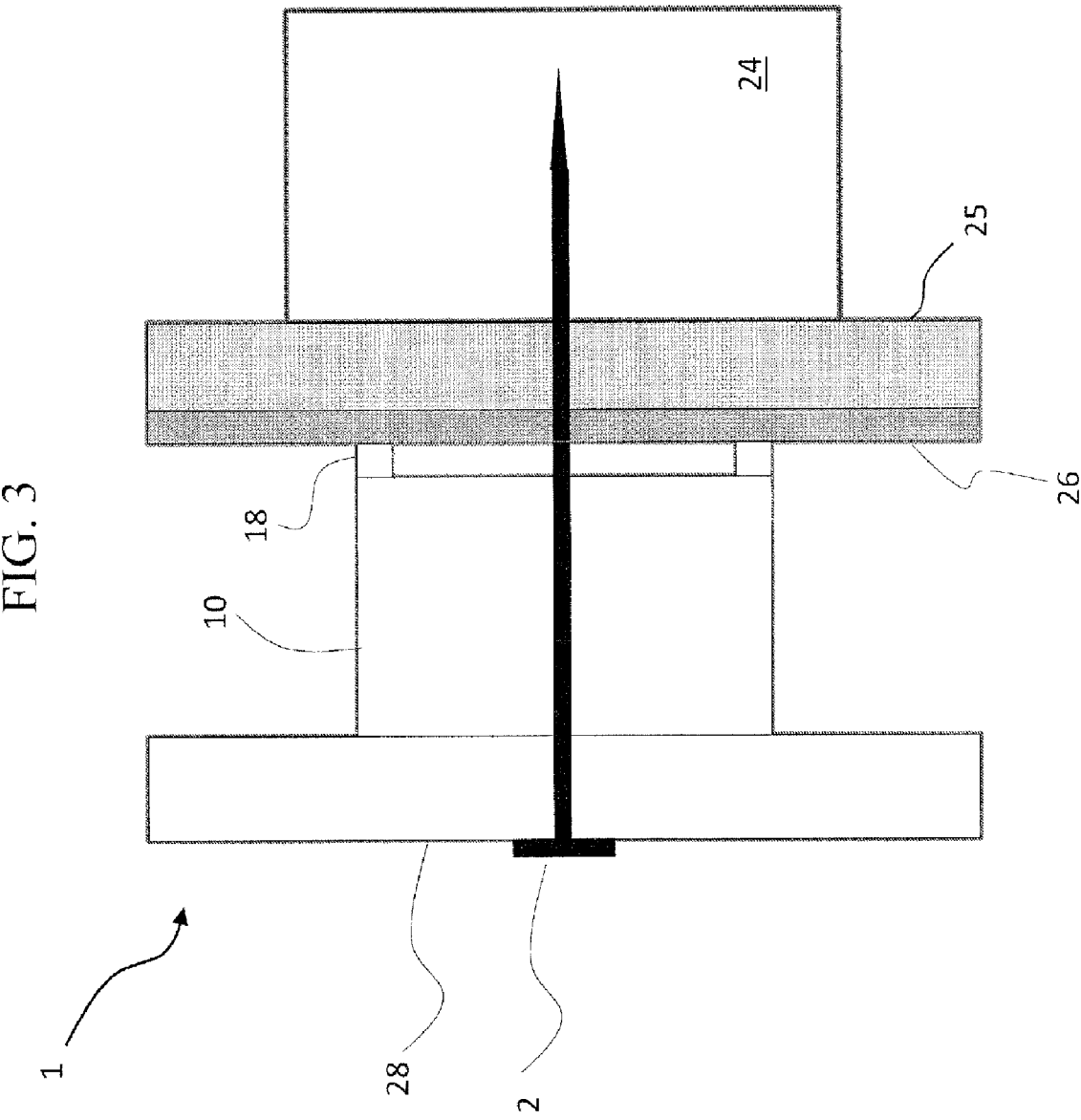
FIG. 3 is a side view illustrating an example of a structure having a self-sealing fastening assembly with the press in an extended position.

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details.

FIG. 1 illustrates a perspective view of an example of a self-sealing fastening assembly. The self-sealing fastening assembly 1 may include a housing 10, a press 50, and a sealant material 60 located within the housing 10 and adjacent to a uniform bottom surface 52 of the press. The assembly may be manufactured to be square, rectangular, circular, or elliptical to align easier to structural components for fastening, but the assembly may be made in any shape.

In a self-sealing fastening assembly having a square configuration, the press 50 may be designed to slidably enter an opening 12 in the housing 10. The length ($l_p$) and width ($w_p$) of the press 50 may be such that they are equal to the length ($l_h$) and width ($w_h$) of the housing 10 minus twice the thickness of the housing walls in each direction. In this manner, the press 50 slides into the opening 12 so that the four side surfaces of the press 50 directly abut the four inner side surfaces of the housing 10. These surfaces may be formed from a single mold, adhered together by adhesive, or created by some other means as would be evident to one of ordinary skill in the art. In another variation, the housing 10 may be composed of a soft, high-density polyethalene or other suitable material. The housing 10 may be interference fit or co-molded in a manner to encompass the press 50 with zero clearance between the press 50 and the inner side surfaces of the housing 10.

The press 50 may be a solid structure composed of a soft, high-density polyethalene or other suitable material. Other variations may include a hollow press 50 with at least a closed upper surface 54 for effectively receiving and distributing the force exerted on the fastening assembly during use. The press 50 may be a structure separate from the housing 10 as shown in FIG. 1, or alternatively, the press 50 and housing 10 may be formed as a single piece.

The assembly 1 enables the press 50 to slidably move into the housing 10 upon an application of force to an upper surface 54. As illustrated in FIG. 2A, the fastening assembly 1 may include the press 50 inserted in the opening 12 of the housing 10. The press 50 has a height ($h_p$) that may be identical to the height of the housing ($h_h$) minus a predetermined clearance.

The sealant material 60 may be located within the housing 10 and lie in a chamber 30 formed between the inside portion of the bottom surface 15 of the housing 10 and the uniform bottom surface 52 of the press 50. In one configuration of a self-sealing fastening assembly, the sealant material 60 may be in package (not shown). The sealant package may be friction fit, adhered or otherwise held in place. The sealant package could also be adhered to the uniform bottom surface 52 of the press 50 or just disposed in place. The sealant package may be a thin, flexible, rupturable material like that of plastic wrap or a plastic bag. Inside the casing of the sealant package is the sealant material 60. The sealant material 60, whether packaged or not may be a caulking material, such as a silicone sealant or the like. As an alternative to sealant material, the self-sealing fastening assembly may contain a lubricant, adhesive, or some other suitable material.

FIG. 2B illustrates the assembly 1 after the press 50 has been pushed into the housing by a pressure applied on the upper surface 54 of the press 50. As the press 50 slides into the housing 10, the press 50 displaces the interior volume of the housing 10 and the uniform bottom surface 52 exerts pressure on the sealant material 60 in the chamber 30, forcing the sealing material 60 through one or more apertures (not shown) in the bottom surface of the housing 10. Alternatively, the bottom surface of the housing 10 may have a mesh structure or some other suitable construction to permit the release of the sealant material 60 from the housing 10. A number of standoffs 18 positioned on the bottom surface of the housing 10 may provide clearance, thus facilitating the discharge of the sealing material 60 from the assembly.

Figure 4:
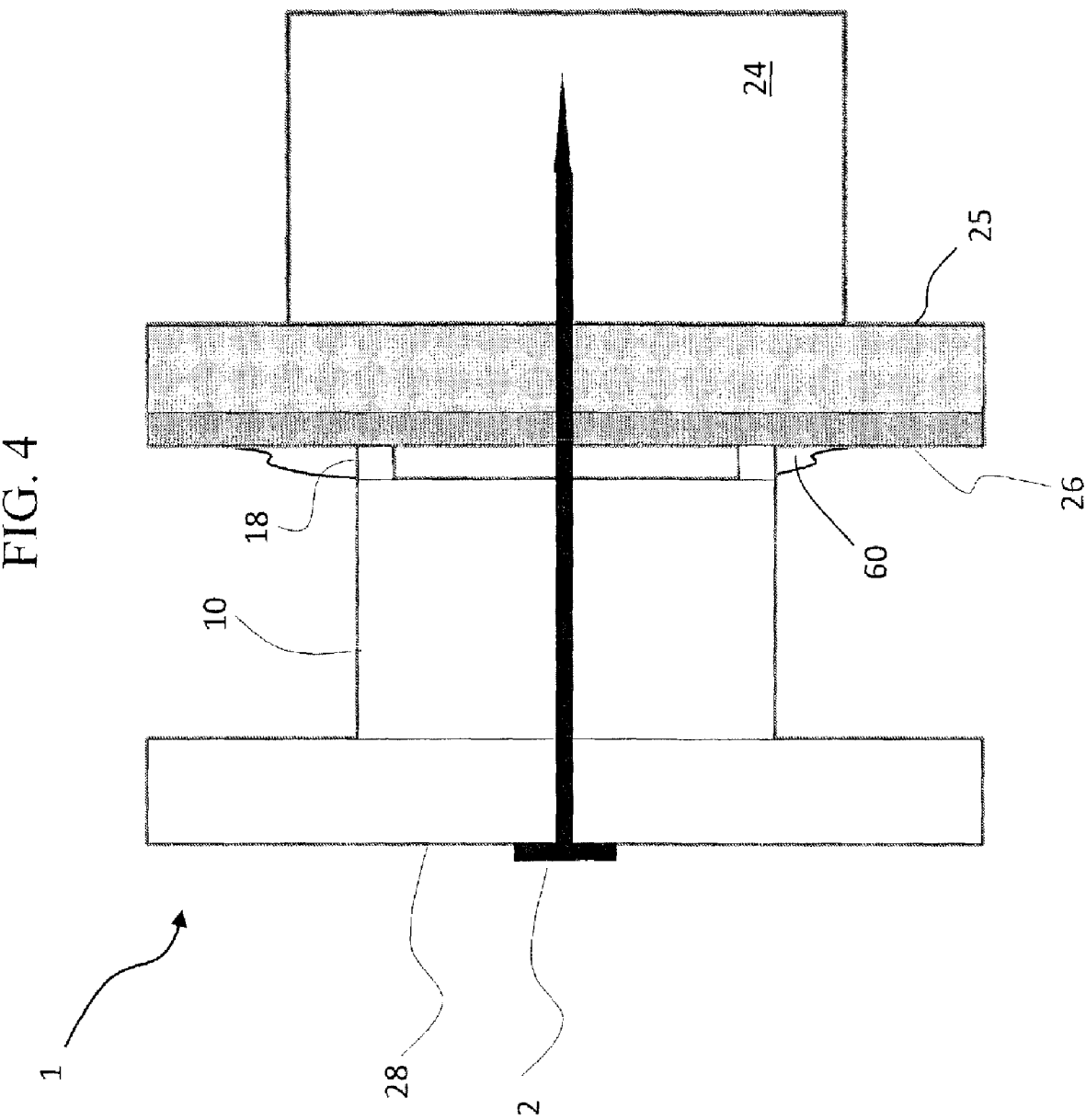
FIG. 4 is a side view illustrating an example of a structure having a self-sealing fastening assembly with the press in a compressed position.

FIGS. 3 and 4 will be used to illustrate operation of the fastening assembly 1. Building paper 26 or other housewrap may be placed around the studs 24 (and where plywood 25 is used over the stud 24). The fastening assemblies may be placed in position by aligning each fastening assembly 1 with a stud 24 so that the bottom surface of the housing 10 faces the paper 26. The fastening assembly 1 may have an adhesive on the bottom surface of the housing 10, or on the lower surfaces of the standoffs 18, so that the fastening assembly may be bonded in place to the paper 26 by simply pressing the assembly 1 against and in the direction of the stud 24. Alternatively, the fastening assembly 1 may be manually held in place while cladding 28 is applied to the structure. The cladding 28 may take the form of siding, plywood, paneling, roofing or any other suitable building material for covering the structure.

Initially, the fastening assembly 1 may have the press 50, as shown in FIG. 3, raised from the interior of the housing 10 so that the chamber 30 is defined by the inner lower surface of the housing 10 and the uniform bottom surface 52 of the press 50 and contains the sealant material 60. The cladding 28 is held up to the assembly and a fastener 2 is driven home through the cladding 28, the fastening assembly 1, paper 26 and into the stud 24. In this example, the fastener 2 is a nail, but may be a screw, bolt, staple, or other fastener in alternative configurations. As the nail 2 drives through the press 50 and into the chamber 30 of the fastening assembly 1, the fastener 2 activates the self-sealing function of the assembly. The head of the nail 2 abuts the cladding 28, wherein continued driving causes the cladding 28 to exert a distributed force across the upper surface 54 of the press 50. The distributed force, in turn, drives the press 50 toward the paper 26, forcing the sealant material 60 through one or more apertures in the bottom surface of the housing 10, as illustrated in FIG. 4. The nail 2 is thus driven until the upper surface 54 of the press 50 is flush with the sides of the housing 10 and the press 50 rests in a fully inserted position inside the housing 10. As discussed previously, the press 50 may be designed with a uniform bottom surface 52 having dimensions that do not allow escape of the sealant material 60 from the chamber 30 in any direction other than through the one or more apertures in the lower surface of housing 10 in a direction toward the paper 26. The sealant material 60 will thus be pushed through the one or more apertures and provide a seal around the nail shank in the area of the penetration hole formed by the nail entering the building paper 26. The sealant material 60 will also cover any enlargements of the hole or small tears in the building paper 26 at the penetration hole due to shifting of the building paper 26 during the construction process caused by wind or other accidental movement or pressure on the building paper 26.

Figure 5:
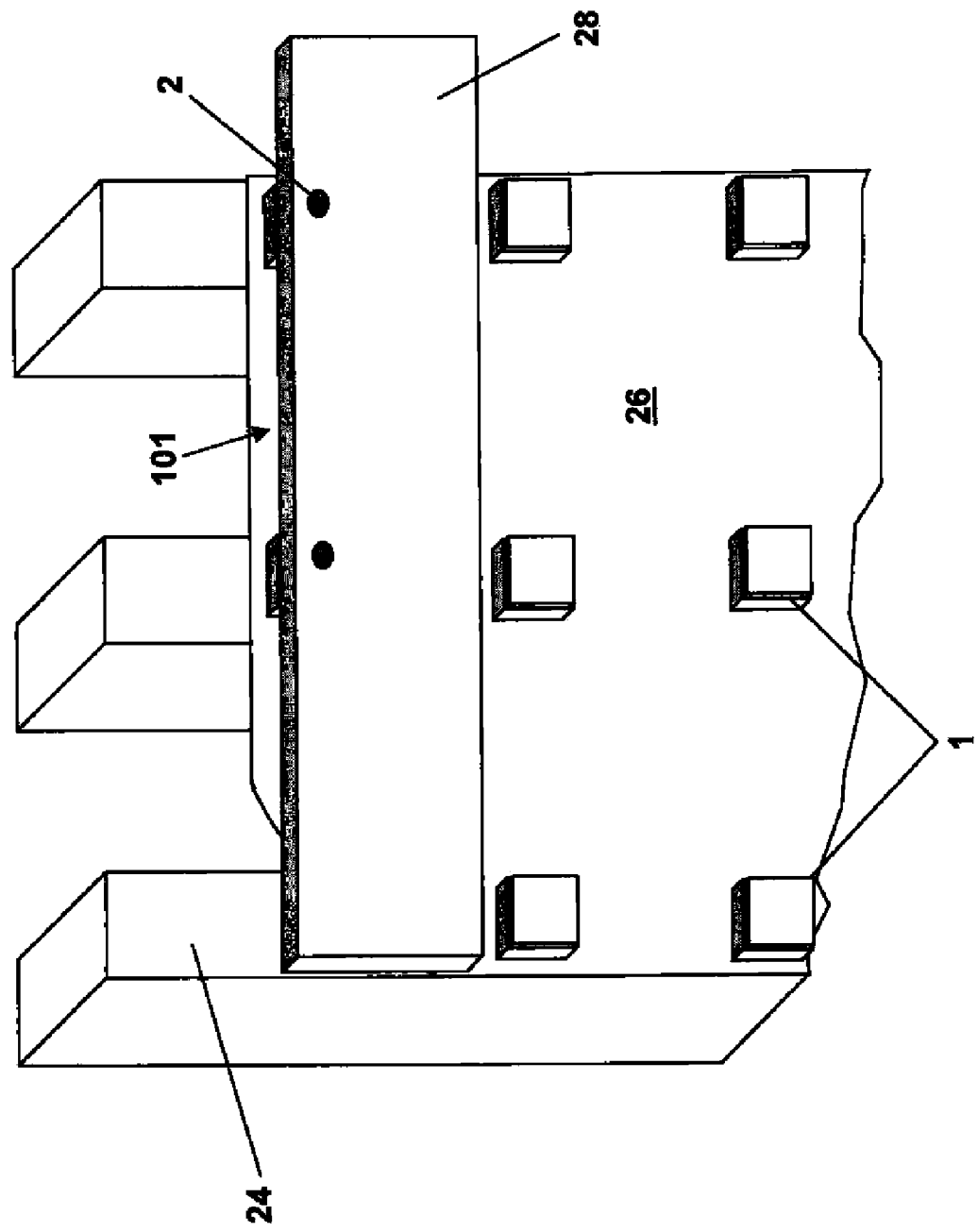
FIG. 5 is a front perspective view illustrating an example of a structure having multiple self-sealing fastening assemblies.

FIG. 5 illustrates an exterior section of a structure in which self-sealing fastening assemblies 1 have been used to hang the cladding 28. The fastening assemblies 1 may be placed at sixteen inch intervals from one another, or the spacing may be provided according to the specific dimensions and requirements of the exterior material being used. The exterior building material may be any type of siding, such as bevel, lap, board and batten, channel, clapboard, shingle, or tongue and groove. In using the fastening assemblies 1 with cladding 28, an air gap 101 may be enabled between the cladding 28 and the paper 26. The air gap 101 may function to keep everything dry by preventing moisture from building up and becoming trapped between the cladding 28 and the paper 26. The gap 101 also may serve as a drainage plane allowing any rain or water that gets behind the cladding 28 to flow down, out and away from the protected structure.

The previous description is provided to enable any person skilled in the art to practice the various embodiments described herein. Various modifications to these embodiments will be readily apparent to those skilled in the art and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A fastening assembly configured to be installed between cladding and a structure, comprising:
   a housing;
   a press having a surface that together with the housing forms a chamber, the press being without a predefined aperture to insert a fastener therein; and
   a material in the chamber;
   wherein the press is movable within the housing to dispense the material from the chamber when impelled by the action of the fastener through the cladding, housing, and press.

2. The fastening assembly of claim 1, wherein the material comprises a sealant.

3. The fastening assembly of claim 1, wherein the press substantially fills an interior volume of the housing when moved into the housing to dispense the material from the chamber.

4. The fastening assembly of claim 1, wherein the press comprises a second surface which is substantially flat, the second surface being configured to receive a force to move the press into the housing to dispense the material from the chamber.

5. The fastening assembly of claim 1, wherein the press comprises a second surface configured to receive a force to move the press into the housing to dispense the material from the chamber, the second surface having an area substantially equal to the area of an interior portion of the housing surface.

6. The fastening assembly of claim 1, wherein the housing comprises standoffs for elevating the housing above the surface.

7. The fastening assembly of claim 1, wherein the housing comprises polyethylene.

8. The fastening assembly of claim 1, wherein the press comprises polyethylene.

9. The fastening assembly of claim 1, wherein the press comprises a solid structure.

10. The fastening assembly of claim 1, wherein the housing comprises a surface that together with the press surface forms the chamber, wherein the housing surface includes one or more apertures to dispense the material from the chamber when the press is moved into the housing.

* * * * *